(12) United States Patent
Smart et al.

(10) Patent No.: US 10,547,566 B2
(45) Date of Patent: Jan. 28, 2020

(54) ETHERNET ADAPTIVE NETWORK REPEATER WITH AUTO-LINK-SPEED NEGOTIATION

(71) Applicant: Deere & Company, Moline, IL (US)

(72) Inventors: David C. Smart, Waterloo, IA (US); Kerry S. Martin, Waterloo, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/720,050

(22) Filed: Sep. 29, 2017

(65) Prior Publication Data
US 2019/0104085 A1    Apr. 4, 2019

(51) Int. Cl.
*H04L 12/825* (2013.01)
*H04L 12/933* (2013.01)
*H04L 29/08* (2006.01)
*H04L 12/931* (2013.01)

(52) U.S. Cl.
CPC .............. *H04L 49/15* (2013.01); *H04L 47/25* (2013.01); *H04L 49/40* (2013.01); *H04L 69/323* (2013.01)

(58) Field of Classification Search
CPC ....... H04L 49/352; H04L 12/46; H04L 47/25; H04L 49/15; H04L 49/40; H04L 67/12; H04L 69/323
See application file for complete search history.

(56) References Cited

U.S. PATENT DOCUMENTS

| | | | |
|---|---|---|---|
| 5,953,340 A * | 9/1999 | Scott | H04L 12/44 370/401 |
| 5,991,303 A | 11/1999 | Mills | |
| 6,690,650 B1 | 2/2004 | Stoner | |
| 6,704,296 B1 * | 3/2004 | Crayford | H04L 12/44 370/279 |
| RE40,827 E | 7/2009 | Butler et al. | |

(Continued)

OTHER PUBLICATIONS

German Search Report issued in counterpart application No. 102018213441.3 dated Jun. 5, 2019. (14 pages).

*Primary Examiner* — Khaled M Kassim
*Assistant Examiner* — Zhaohui Yang
(74) *Attorney, Agent, or Firm* — Taft Stettinius & Hollister LLP; Stephen F. Rost

(57) ABSTRACT

An adaptive network repeater is disclosed for electronically connecting first and second subnetworks. The adaptive network repeater includes a first network interface coupled to the first subnetwork, a second network interface coupled to the second subnetwork, and a controller that monitors communication link status between the first and second subnetworks across the adaptive network repeater. Data received from the first subnetwork at the first network interface is retransmitted to the second subnetwork through the second network interface, and data received from the second subnetwork at the second network interface is retransmitted to the first subnetwork through the first network interface. When the controller determines that the first and second subnetworks want to communicate across the adaptive network repeater at incompatible communication speeds, the controller determines a compatible communication speed and causes the first and second subnetworks to communicate across the adaptive network repeater at the compatible communication speed.

15 Claims, 4 Drawing Sheets

(56) References Cited

U.S. PATENT DOCUMENTS

| | | | |
|---|---|---|---|
| 2002/0146043 A1 | 10/2002 | McRobert et al. | |
| 2003/0218990 A1 | 11/2003 | Tung et al. | |
| 2005/0073965 A1* | 4/2005 | Yamauchi | H04L 43/00 370/293 |
| 2007/0192505 A1* | 8/2007 | Dalmia | H04L 5/1446 709/233 |
| 2008/0290729 A1* | 11/2008 | Schoenberg | H04B 3/36 307/3 |

* cited by examiner

ETHERNET ADAPTIVE NETWORK REPEATER WITH AUTO-LINK-SPEED NEGOTIATION

FIELD OF THE DISCLOSURE

The present disclosure relates to Ethernet communications, and more particularly to an adaptive Ethernet repeater or extender that automatically negotiates link-speed to maximize bandwidth.

BACKGROUND

Ethernet repeaters, also called Ethernet extenders, are commonly composed of a pair of PHYs (Ethernet Physical Interface chips) that are wired back-to-back. Part of the typical "hard-wired" configuration is the link speed. In the simplest form, this is a pair of PHY chips directly wired back-to-back. They could be individual chips or a "dual-PHY" on a single chip. The common purpose of a repeater is to overcome signal degradation due to cable length by recovering and recreating (i.e., repeating) the data stream on the next link segment. Because of the intended purpose of a repeater, it is a 2-port device.

Ethernet switches are network devices that typically have three or more ports, each of which can receive (input) or send (output) data. The switch processes and forwards data from an input port to the appropriate output port(s). An "unmanaged" switch can have internal logic that controls the negotiation and buffering of the data to route messages received on one port to the appropriate port(s) based upon the unique Media Access Control (MAC) address of the endpoint PHY. A "managed" switch does more, as the name implies. For example, a "managed" switch may be designed to support advanced protocols, such as Audio Video Bridging (AVB) and Time Sensitive Networking (TSN), which require more complex "fabric" in the chip itself to deal with these protocols, and may require an advanced microcontroller to configure/manage the switch fabric, and thus the data flow. The microcontroller may be completely external to the switch chip, or may be integrated on the switch chip, or the switch may use a microprocessor to manage more complex electronic "fabric" which can accept Ethernet packets on more than one port, determine which port, or ports, to route that traffic to, and then forward it to the appropriate ports. Connected between the switch fabric chip and the module connector is a PHY, one for each port. Switches may also have an integrated PHY. These switch capabilities raise the complexity of the device which requires more advanced microprocessors/microcontrollers.

It would be desirable to not require the complexity of advanced software management of the interface, even for advanced network protocols, and to avoid the cost/complexity of an Ethernet Switch or advanced microcontroller, by providing just enough intelligence in a simple repeater that it can auto-negotiate link speed using a simpler and less expensive microcontroller. A sufficiently simple implementation may be deemed "provable correct" and avoid the complexity of more advanced microcontrollers and complex software. This may also reduce the potential for software defects and avoid the complexity of requiring field reprogramming or replacement of a microcontroller.

SUMMARY

An adaptive network repeater is disclosed for electronically connecting a first subnetwork with a second subnetwork. The adaptive network repeater includes a first network interface, a second network interface and a controller. The first network interface is coupled to the first subnetwork. The second network interface is coupled to the second subnetwork. The controller monitors communication link status between the first and second subnetworks across the adaptive network repeater. Data received from the first subnetwork at the first network interface is retransmitted to the second subnetwork through the second network interface, and data received from the second subnetwork at the second network interface is retransmitted to the first subnetwork through the first network interface. When the controller determines that the first and second subnetworks want to communicate across the adaptive network repeater at incompatible communication speeds, the controller determines a compatible communication speed and causes the first and second subnetworks to communicate across the adaptive network repeater at the compatible communication speed.

The adaptive network repeater can also include a first Ethernet physical interface controller (PHY) coupled to the first network interface, and a second PHY coupled to the second network interface. The second PHY is cross-coupled with the first PHY such that data received by the first PHY is transmitted by the second PHY, and data received by the second PHY is transmitted by the first PHY. The first PHY can have a first receive data output (RXD) port, a first transmit data input (TXD) port and a first input/output data management (MDIO) port. The second PHY can have a second RXD port, a second TXD port and a second MDIO port. The first RXD port can be connected to the second TXD port, the first TXD port can be connected to the second RXD port, and the first MDIO port can be connected to the second MDIO port. The controller can monitor communication link status across the adaptive network repeater by monitoring the first and second MDIO ports. The adaptive network repeater can also include a voltage regulator that accepts power through a power port and supplies power to the first and second PHYs and the controller.

Each of the first and second PHYs can auto-negotiate to communicate at a slower speed and a faster speed, where the faster speed is faster than the slower speed. When the first PHY auto-negotiates with the first subnetwork to communicate at the slower speed and the second PHY auto-negotiates with the second subnetwork to communicate at the slower speed, the controller allows communication between the first and second PHYs at the slower speed. When the first PHY auto-negotiates with the first subnetwork to communicate at the faster speed and the second PHY auto-negotiates with the second subnetwork to communicate at the faster speed, the controller allows communication between the first and second PHYs at the faster speed. When the first PHY auto-negotiates with the first subnetwork to communicate at the faster speed and the second PHY auto-negotiates with the second subnetwork to communicate at the slower speed, the controller forces the first PHY to communicate at the slower speed which causes communication between the first and second PHYs at the slower speed and causes the first PHY to renegotiate with the first subnetwork to communicate at the slower speed. When the first PHY auto-negotiates with the first subnetwork to communicate at the slower speed and the second PHY auto-negotiates with the second subnetwork to communicate at the faster speed, the controller forces the second PHY to communicate at the slower speed which causes communication between the first and second PHYs at the slower speed and causes the second PHY to renegotiate with the second subnetwork to communicate at the slower speed. The slower speed can be 100 megabits/second (Mb/s) and the faster speed can be 1000 Mb/s.

A network capable of communicating at different communication speeds is disclosed. The network includes an adaptive network repeater, a first subnetwork and a second subnetwork. The adaptive network repeater has a first network interface and a second network interface. The first subnetwork is coupled to the first network interface of the adaptive network repeater, and the second subnetwork is coupled to the second network interface of the adaptive network repeater. Data received from the first subnetwork at the first network interface is retransmitted to the second subnetwork through the second network interface, and data received from the second subnetwork at the second network interface is retransmitted to the first subnetwork through the first network interface. When the adaptive network repeater determines that the first and second subnetworks want to communicate across the adaptive network repeater at incompatible communication speeds, the adaptive network repeater determines a compatible communication speed and communicates with the first and second subnetworks at the compatible communication speed.

The adaptive network repeater of the network can include a first PHY coupled to the first network interface, a second PHY coupled to the second network interface, and a controller that monitors communication link status between the first and second PHYs. The second PHY can be cross-coupled with the first PHY such that data received by the first PHY is transmitted by the second PHY and data received by the second PHY is transmitted by the first PHY. The controller can control communication speed across the adaptive network repeater by control of communication speed of each of the first and second PHYs. Each of the first and second PHYs can auto-negotiate to communicate at a slower speed and a faster speed.

The first subnetwork can include a first switch and a first plurality of electronic devices, where each of the first switch and the first plurality of electronic devices are capable of communicating at at least one of the slower and faster speeds. The first switch can be electronically connected to the first network interface of the adaptive network repeater, and the first plurality of electronic devices can be electronically connected to the adaptive network repeater through the first switch. When any of the first plurality of electronic devices of the first subnetwork communicates with the second subnetwork across the adaptive network repeater, the controller of the adaptive network repeater determines the communication speed.

The second subnetwork can include a second switch and a second plurality of electronic devices, where each of the second switch and the second plurality of electronic devices are capable of communicating at at least one of the slower and faster speeds. The second switch can be electronically connected to the second network interface of the adaptive network repeater, and the second plurality of electronic devices can be electronically connected to the adaptive network repeater through the second switch. When any of the plurality of electronic devices of the second subnetwork communicates with the first subnetwork across the adaptive network repeater, the controller of the adaptive network repeater determines the communication speed.

Network communication can have a distance limit beyond which communication is unreliable. The distance between the first and second switches can be greater than the distance limit, and the distance between the first switch and the adaptive network repeater and the distance between the second switch and the adaptive network repeater is less than the distance limit.

The second subnetwork can be a second electronic device capable of communicating at at least one of the slower and faster speeds, where the second electronic device is electronically connected to the second network interface of the adaptive network repeater. When the second electronic device communicates with the first subnetwork across the adaptive network repeater, the controller of the adaptive network repeater determines the communication speed. The distance between the first switch and the second electronic device can be greater than the distance limit, and the distance between the first switch and the adaptive network repeater and the distance between the second electronic device and the adaptive network repeater is less than the distance limit.

A network communication method is disclosed for communicating between a first subnetwork and a second subnetwork at different communication speeds. The network communication method includes electronically connecting the first subnetwork to a first network interface of an adaptive network repeater; electronically connecting the second subnetwork to a second network interface of the adaptive network repeater; retransmitting data received from the first subnetwork at the first network interface to the second subnetwork through the second network interface; retransmitting data received from the second subnetwork at the second network interface to the first subnetwork through the first network interface; and when the adaptive network repeater determines that the first and second subnetworks want to communicate across the adaptive network repeater at incompatible communication speeds, determining a compatible communication speed, and renegotiating communication between the first and second subnetworks across the adaptive network repeater at the compatible communication speed.

The network communication method can also include auto-negotiating between the adaptive network repeater and the first subnetwork to communicate at a first communication speed; auto-negotiating between the adaptive network repeater and the second subnetwork to communicate at a second communication speed, where the second communication speed can be the same or different than the first communication speed. If the first and second communication speeds are the same communication speed, allowing communication across the adaptive network repeater at the same communication speed. If the first and second communication speeds are different communication speeds: determining the compatible communication speed, if the first communication speed is not the compatible communication speed, forcing renegotiation between the adaptive network repeater and the first subnetwork to communicate at the compatible communication speed; and if the second communication speed is not the compatible communication speed, forcing renegotiation between the adaptive network repeater and the second subnetwork to communicate at the compatible communication speed.

When one of the first and second subnetworks can communicate at a slower communication speed and a faster communication speed, and the other of the first and second subnetworks can only communicate at the slower communication speed, where the faster communication speed is faster than the slower communication speed; determining the compatible communication speed comprises selecting the slower communication speed. The network communication can have a distance limit beyond which communication is unreliable, and when the distance between the first and second subnetworks is greater than the distance limit, the method can include electronically connecting the adaptive network repeater between the first and second subnetworks such that the distance between the first subnetwork and the adaptive network repeater is less than the distance limit and the distance between the second subnetwork and the adaptive network repeater is less than the distance limit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Ethernet communication devices, for example routers, switches, repeaters/extenders continue to add greater functionality, which also brings greater complexity and greater cost not only in the device itself but also in the associated software. In some applications, only limited functionality is required and it is desirable to have a simpler and less expensive device that does not have the unrequired functionality. For example, some applications may only require a simple repeater that can auto-negotiate link speed to maximize bandwidth. A sufficiently simple implementation may avoid the complexity of more advanced hardware and complex software, which may not only reduce the cost of the device but also reduce the potential for software defects and avoid the complexity of requiring field reprogramming or replacement of the device.

Figure 1:
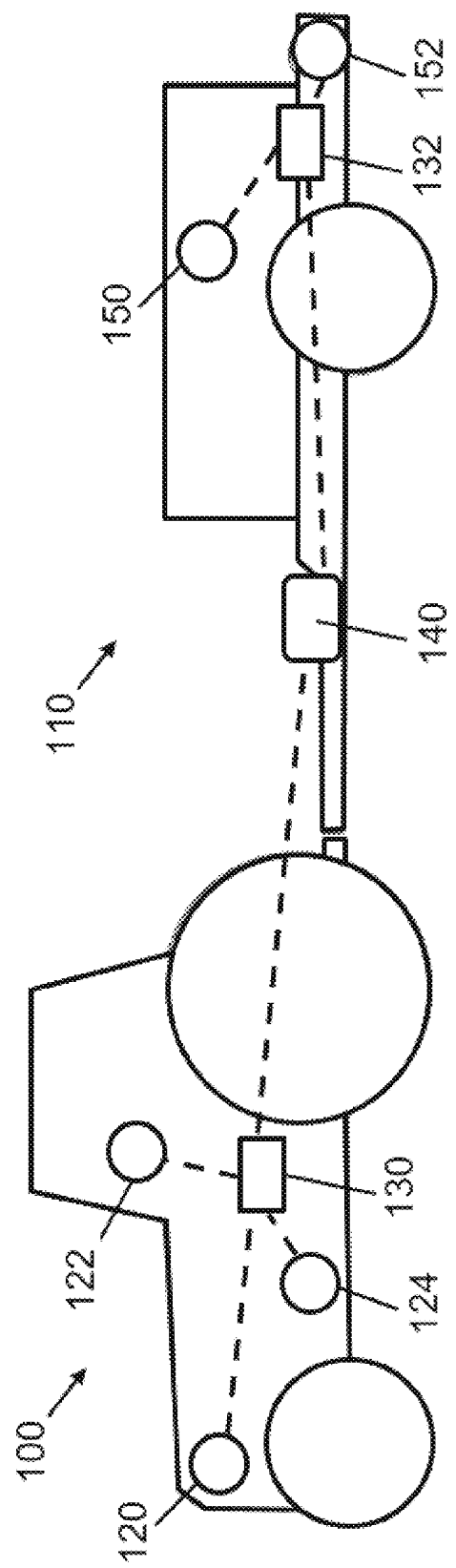
FIG. 1 illustrates an exemplary environment for an adaptive network repeater.

FIG. 1 illustrates an exemplary environment for an adaptive network repeater with limited functionality. FIG. 1 illustrates a vehicle 100 coupled to an implement or trailer 110. The vehicle 100 can be, for example, an agricultural tractor, a construction vehicle, a semi-trailer tractor, etc. The implement or trailer 110 can be, for example, an agricultural implement, a trailer, a boom, a construction implement, etc. The vehicle 100 can have one or more electronic devices 120-124 electronically coupled to a first switch 130. The implement 110 can also have one or more electronic devices 150-152 electronically coupled to a second switch 132. The electronic devices 120-124, 150-152 can be, for example, computers, display devices, cameras, sensors, actuators, etc. For any of various reasons the first and second switches 130, 132 may not effectively be able to communicate with one another, for example due to distance, communication speeds, etc. An adaptive network repeater 140 can enable effective communication between the first and second switches 130, 132 which in turn enables effective communication between the electronic device(s) 120-124 of the tractor 100 and the electronic device(s) 150-152 of the implement 110. The example of FIG. 1 shows three electronic devices 120, 122, 124 for the tractor 100 and two electronic devices 150, 152 for the implement 110, however each of the tractor 100 and implement 110 can have any number of electronic devices that can be effectively handled by the associated switches 130, 132.

Figure 2:
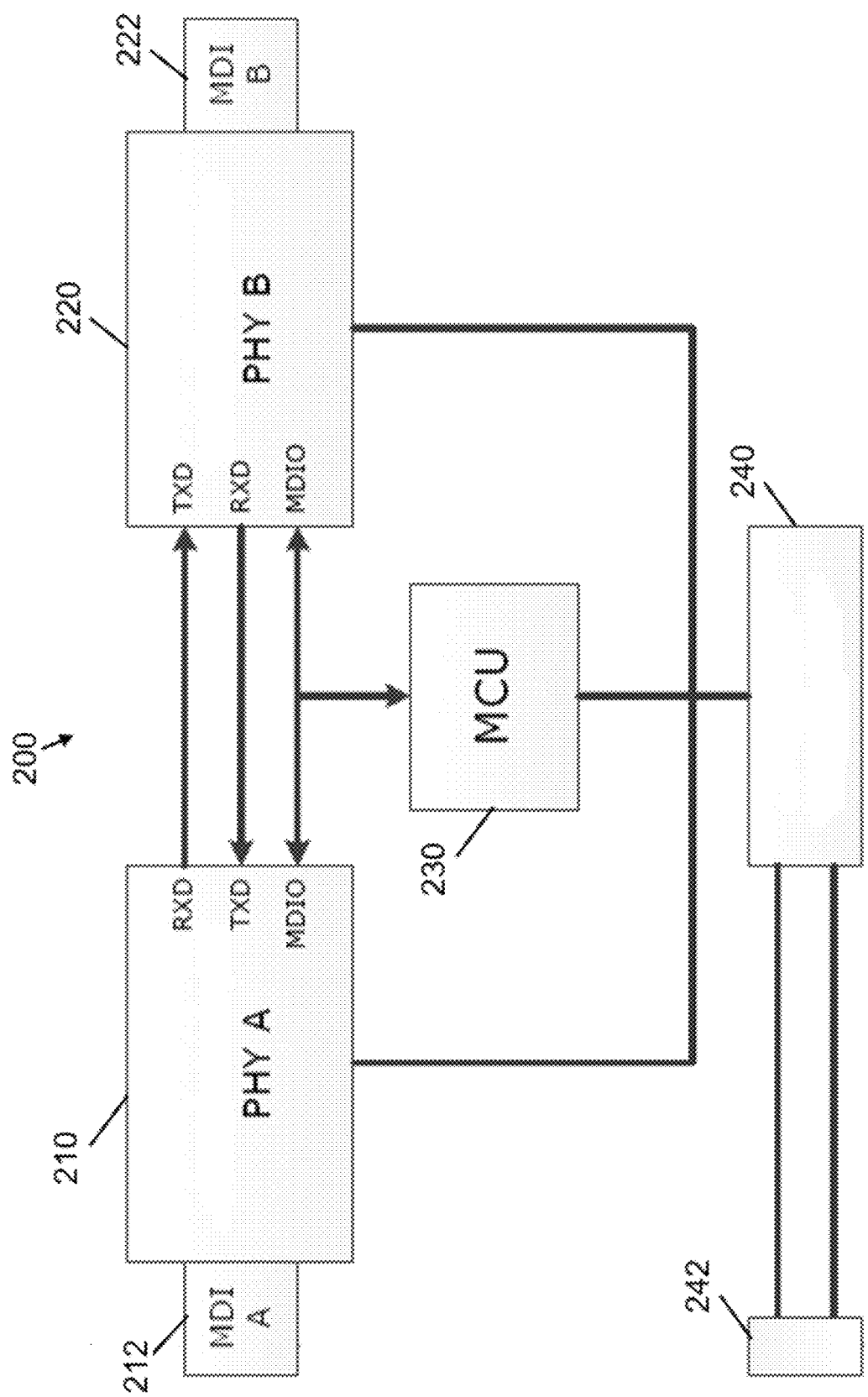
FIG. 2 is a block diagram that illustrates an exemplary embodiment of an adaptive network repeater.

FIG. 2 is a block diagram that illustrates an exemplary embodiment of an adaptive network repeater 200 that includes a first Ethernet Physical Interface controller (PHY) 210, a second PHY 220 and a controller 230. The first PHY 210 is connected to a first media dependent network interface (MDI) 212 which is an electrical connector for a network cable. The second PHY 220 is connected to a second MDI 222 which is also an electrical connector for a network cable. Each of PHY 210 and 220 includes a management data input/output (MDIO) port, a received data output (RXD) port, and a transmit data input (TXD) port. The RXD/TXD interface is known as a Media Independent Interface (MII) which has several variants. The adaptive network repeater 200 is not specific to any variant, and can be used with the MII interface or variants thereof and similar interfaces. The controller 230 is connected to the MDIO ports of the first and second PHYs 210, 220 to control data transmission. The adaptive network repeater 200 can also include a voltage regulator 240 that accepts power from a power port 242, and provides the voltages necessary for the first PHY 210, the second PHY 220 and the controller 230 to operate properly. It should be clear to others skilled in the art that the power source could be derived from the MDI 212, or MDI 222, using standardized technology such as Power over Ethernet (PoE), or Power over Data Lines (PoDL), and thus a dedicated power port 242 is not required.

The first and second PHYs 210, 220 are cross-coupled, such that data received by PHY 210 through MDI 212 is sent from the RXD port of PHY 210 to the TXD port of PHY 220 for transmission from PHY 220 through the MDI 222; and data received by PHY 220 through MDI 222 is sent from the RXD port of PHY 220 to the TXD port of PHY 210 for transmission from PHY 210 through the MDI 212.

The adaptive network repeater 200 has two network interfaces 212, 222. Data received through a network cable connected to one of the two network interfaces is repeated by the adaptive network repeater 200 and transmitted through a network cable connected to the other of the two network interfaces. Where a traditional repeater is configured for a single speed of communication, and without the ability to adapt if a device attached to MDI 212 is not communicating at the same speed as a device attached to MDI 222, the adaptive network repeater 200 adds a microcontroller unit (MCU) 230, which can monitor and control data communication link status of both PHY 210 and PHY 220 through a bidirectional interface to the MDIO port of each of PHY 210 and PHY 220. The microcontroller 230 can be a small, inexpensive micro-controller, for example an 8-bit microcontroller.

The first and second PHYs 210, 220 are each capable of auto-negotiation. In the case of the first PHY 210, auto-negotiation means that if a network device attached to the first MDI 212 is capable of one or more communication speeds then in the auto-negotiation process, the first PHY 212 and the attached device will detect and agree on a communication speed. Under normal operation, this would be the highest speed that both the first PHY 212 and the attached device are capable of. The second PHY 220 can similarly auto-negotiate a communication speed with a network device attached to the second MDI 222.

By monitoring both PHY 210 and PHY 220, the MCU 230 can detect if devices are connected to MDI 212 and MDI 222, and what communication speed has been negotiated for each device. If the negotiated speeds are incompatible to pass the data from PHY 210 to/from PHY 220, the MCU 230 can identify the PHY 210 or 220 that negotiated to the faster communication speed and force a speed change to a slower and compatible communication speed. This will force a negotiation across the affected network interface, so that data can pass between the two network interfaces 212, 222 and the PHYs 210, 220 at a speed compatible with both network devices connected to the network interfaces 212, 222.

FIG. 3 illustrates four representative topologies where the adaptive network repeater 200 may be used in a typical system composed of off-road equipment.

Figure 3A:
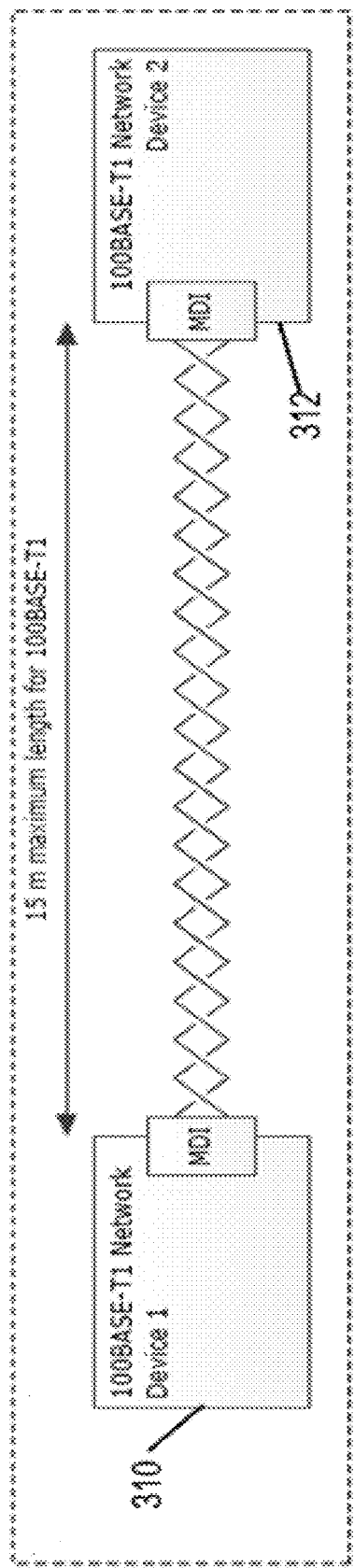
FIG. 3A illustrates an exemplary reference network topology.

FIG. 3A illustrates a reference topology. An exemplary PHY, for which the design supports the automotive environment is referred to as 100BASE-T1. A design constraint of this technology is that a single twisted pair network cable segment connecting two network devices 310, 312 should not exceed a distance limit, which in this case is 15 meters (15 m) in length. The signal quality may degrade for cable lengths beyond the distance limit, introducing errors in the communication, and potentially the complete inability to communicate between the network devices 310, 312. In an automotive application, the 15 m distance limit is usually sufficient, however in other applications, such as in large off-road equipment, the physical design of the system may require placing network nodes further apart than this distance limit.

The 15 m distance limit example relates to the 100BASE-T1 technology, but any of the available Ethernet technologies has a practical distance limit, which can be extended with the repeater. For example, the 1000BASE-T1 (FIG. 3C/3D) has both a 15 m distance limit (for 1000BASE-T1 type A) and a 40 m distance limit (for 1000BASE-T1 type B), and even traditional 100BASE-TX has a practical distance limit of about 100 meters (depending on cable quality) which can be similarly extended.

Figure 3B:
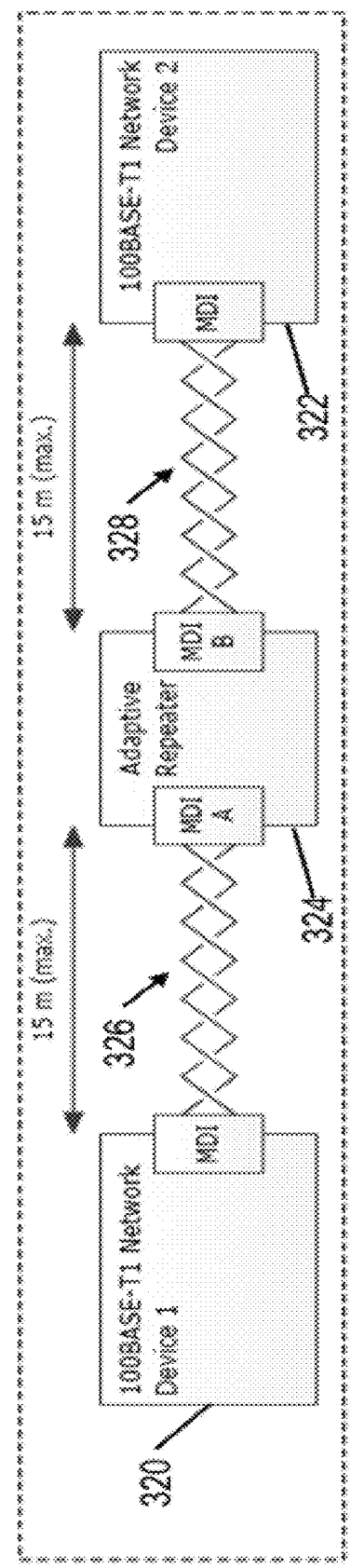
FIG. 3B illustrates an exemplary 100 megabit/second (Mb/s) network topology extended by an adaptive network repeater.

FIG. 3B illustrates extending a 100 megabit/second (Mb/s) network. In FIG. 3B, an adaptive network repeater 324 is placed between two network devices 320 and 322. This creates a first network segment 326 between the network device 320 and the adaptive network repeater 324, and a second network segment 328 between the network device 322 and the adaptive network repeater 324. As long as each network segment 326, 328 does not exceed the distance limit, the data can be repeated by the adaptive network repeater 324 from one network segment onto the other network segment and the signal degradation can be maintained within specification. Additional adaptive network repeaters 324 may be placed in-line to further extend the network. Note that in this example, both the network device 320 and the network device 322 are capable of 100BASE-T1 communications, so a fixed-speed 100 Mb/s repeater could have been used.

Figure 3C:
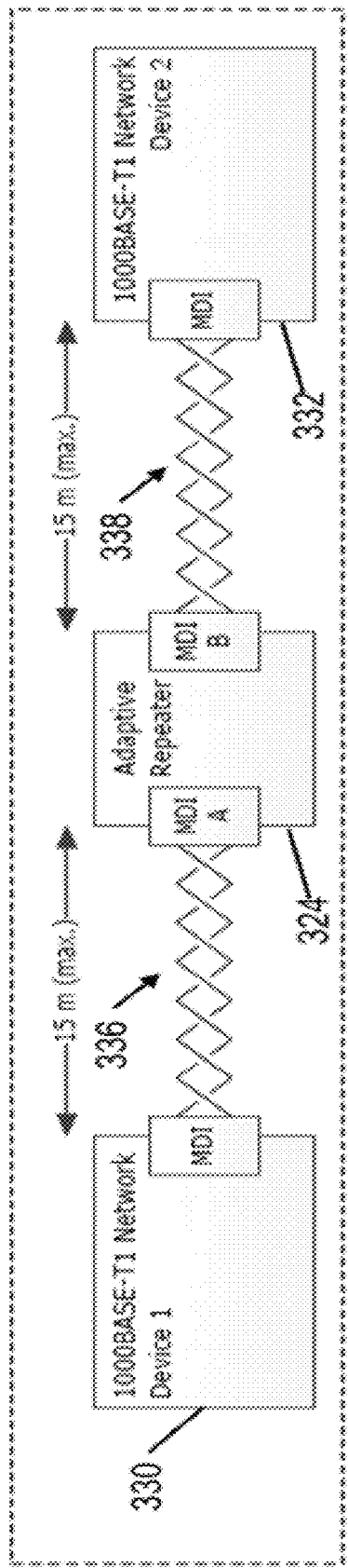
FIG. 3C illustrates an exemplary 1000 Mb/s network topology extended by an adaptive network repeater.

FIG. 3C illustrates extending a 1000 megabit/second (Mb/s) network. This is very similar to the example in FIG. 3B except that in this case both network devices 330, 332 are capable of 1000BASE-T1 communication which has the same design constraint that a single network cable segment connecting two network devices should not have a length exceeding the distance limit. In FIG. 3C, the adaptive network repeater 324 is placed between two network devices 330 and 332. This creates a first network segment 336 between the network device 330 and the adaptive network repeater 324, and a second network segment 338 between the network device 332 and the adaptive network repeater 324. As long as each network segment 336, 338 does not exceed the distance limit, the data can be repeated by the adaptive network repeater 324 from one network segment onto the other network segment and the signal quality can be maintained within specification. Additional adaptive network repeaters 324 may be placed in-line to further extend the network. Note that in this example, both the network device 330 and the network device 332 are capable of 1000BASE-T1 communications, so a fixed-speed 1000 Mb/s repeater could have been used.

Figure 3D:
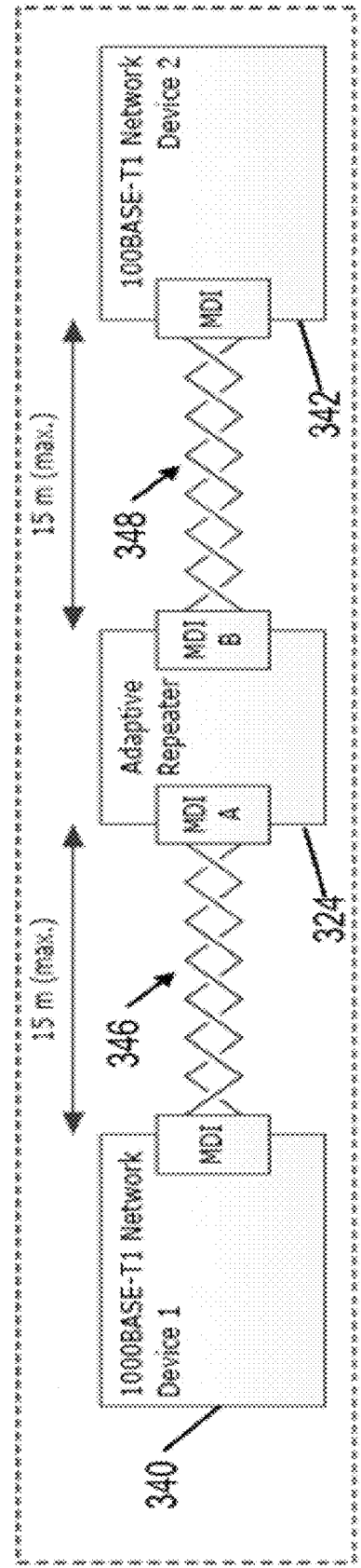
FIG. 3D illustrates an exemplary network topology with a 1000 Mb/s network device coupled to a 100 Mb/s network device by an adaptive network repeater.

FIG. 3D illustrates adaptively extending a network that includes both a 100 Mb/s network device and a 1000 Mb/s network device. In FIG. 3D, the adaptive network repeater 324 is placed between a 1000 Mb/s network device 340 and a 100 Mb/s network device 342. This creates a first network segment 346 between the network device 340 and the adaptive network repeater 324, and a second network segment 348 between the network device 342 and the adaptive network repeater 324. As long as each network segment 346, 348 does not exceed the distance limit, the data can be repeated by the adaptive network repeater 324 from one network segment onto the other network segment and the signal degradation can be maintained within specification. Additional adaptive network repeaters 324 may be placed in-line to further extend the network. Note that in this example, a fixed 1000 Mb/s repeater could not be used, but a fixed 100 Mb/s repeater could be used. However, a fixed 100 Mb/s repeater would always force network device 340 to negotiate down to the 100 Mb/s speed even if network device 342 was a 1000 Mb/s network device.

Using the exemplary adaptive network repeater 200 illustrated in FIG. 2 for the adaptive network repeater 324 of FIG. 3D, the following series of events occurs when the 1000BASE-T1 device 340 is connected to the MDI port 212 of the PHY 210 and the 100BASE-T1 device 342 is connected to the MDI port 222 of the PHY 220. In this case, the PHY 210 will auto-negotiate to a speed of 1000 Mb/s which is the highest speed supported by the network device 340; and the PHY 220 will auto-negotiate to a speed of 100 Mb/s which is the highest speed supported by the network device 342. However, in this case the RXD/TXD signals between PHY 210 and PHY 220 would be incompatible and any data transferred through the repeater/extender would be garbled without the controller 230. The microcontroller 230 polls the two PHYs 210, 220 over the MDIO bus to determine the status of auto-negotiation. When the two PHYs 210, 220 auto-negotiate to incompatible speeds, the microcontroller 230 forces one of the two PHYs 210, 220 to renegotiate to a compatible speed. In the case shown in FIG. 3D, the microcontroller 230 would force the PHY 210 to renegotiate to a communication speed of 100 Mb/s with the network device 340. After the renegotiation, the adaptive network repeater 324 would enable network communications between the network devices 340, 342 at a speed of 100 Mb/s.

It is also possible for a link speed to change, for example when one network device is disconnected and another network device is connected to an adaptive network repeater 200. For example, returning to the exemplary system of FIG. 1 which includes a vehicle 100 coupled to an implement 110. FIG. 1 shows multiple network devices 120, 122, 124 electronically coupled to the first switch 130 on the vehicle 100, and multiple network devices 150, 152 electronically coupled to the second switch 132 on the trailer 110. The two switches 130, 132 are electronically coupled to the adaptive network repeater 140 to enable the network devices 120-124 of the vehicle 100 to communicate with the network devices 150-152 of the implement 110. Each of the devices 120-124, 150-152 may be capable of different communication speeds, for example some may be 1000BASE-T1 capable and others may only be 100BASE-T1 capable. Further, one variant of the represented tractor 100 may also be capable of 1000BASE-T1 where another variant may only be capable of 100BASE-T1. If the first device 150 of the trailer 110 only supports 100 Mb/s communication speed and the second device 152 of the trailer 110 supports 1000 Mb/s communication speed, and both devices 150, 152 communicate with the device 122 of the vehicle 100 which supports 1000 Mb/s communication speed, then the adaptive network repeater 140 must monitor the negotiated speeds on each side and adapt the communication speed depending on whether the first device 150 or the second device 152 of the trailer 110 is currently communicating with the device 122 of the vehicle 100. The adaptive nature of this repeater/extender 140 needs to be dynamic to provide the highest bandwidth over the network. The adaptive network repeater 140 only needs to adapt to the devices communicating to it. For example, the devices connected to the other ports of the switches 130, 132 may negotiate independently, and should not affect the speed of the devices currently communicating across the link between switches 130, 132 through the adaptive network repeater 140

FIG. 1 is just one example of a network with an adaptive network repeater 140. The adaptive network repeater 140 does not need to be connected between two switches. The adaptive network repeater 140 may be connected, for example, between two switches, between a switch and a device, or between two devices (i.e. switchless). The scope of this patent is intended to cover all of these and similar scenarios. For these various combinations of equipment, the adaptive network repeater 140 supports both the physical needs of the system (to enable devices to be greater than a distance limit apart), and the logical needs of the system (to be able to adapt their communication speeds to maximize bandwidth).

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An adaptive network repeater for electronically connecting a first subnetwork with a second subnetwork, the adaptive network repeater comprising:
   a first network interface coupled to the first subnetwork;
   a second network interface coupled to the second subnetwork;
   a controller that monitors communication link status between the first and second subnetworks across the adaptive network repeater;
   a first Ethernet physical interface controller (PHY) coupled to the first network interface;
   a second PHY coupled to the second network interface, the second PHY cross-coupled with the first PHY such that data received by the first PHY is transmitted by the second PHY, and data received by the second PHY is transmitted by the first PHY;
   wherein data received from the first subnetwork at the first network interface is retransmitted to the second subnetwork through the second network interface, and data received from the second subnetwork at the second network interface is retransmitted to the first subnetwork through the first network interface; and
   wherein when the controller determines that the first and second subnetworks want to communicate across the adaptive network repeater at incompatible communication speeds, the controller determines a compatible communication speed, causes the first network interface to communicate with the first subnetwork at the compatible communication speed, and causes the second network interface to communicate with the second subnetwork at the compatible communication speed;
   wherein each of the first and second PHYs can auto-negotiate to communicate at a slower speed and a faster speed, the faster speed being faster than the slower speed, and
      when the first PHY auto-negotiates with the first subnetwork to communicate at the slower speed and the second PHY auto-negotiates with the second subnetwork to communicate at the slower speed, the controller allows communication between the first and second PHYs at the slower speed;
      when the first PHY auto-negotiates with the first subnetwork to communicate at the faster speed and the second PHY auto-negotiates with the second subnetwork to communicate at the faster speed, the controller allows communication between the first and second PHYs at the faster speed;
      when the first PHY auto-negotiates with the first subnetwork to communicate at the faster speed and the second PHY auto-negotiates with the second subnetwork to communicate at the slower speed, the controller forces the first PHY to communicate at the slower speed which causes communication between the first and second PHYs at the slower speed and causes the first PHY to renegotiate with the first subnetwork to communicate at the slower speed; and
      when the first PHY auto-negotiates with the first subnetwork to communicate at the slower speed and the second PHY auto-negotiates with the second subnetwork to communicate at the faster speed, the controller forces the second PHY to communicate at the slower speed which causes communication between the first and second PHYs at the slower speed and causes the second PHY to renegotiate with the second subnetwork to communicate at the slower speed.

2. The adaptive network repeater of claim 1, wherein:
the first PHY has a first receive data output (RXD) port, a first transmit data input (TXD) port and a first input/output data management (MDIO) port,
the second PHY has a second RXD port, a second TXD port and a second MDIO port, and
wherein the first RXD port is connected to the second TXD port, the first TXD port is connected to the second RXD port, the first MDIO port is connected to the second MDIO port, and the controller monitors communication link status across the adaptive network repeater by monitoring the first and second MDIO ports.

3. The adaptive network repeater of claim 1, further comprising a voltage regulator that accepts power through a power port and supplies power to the first and second PHYs and the controller.

4. The adaptive network repeater of claim 1, wherein the slower speed is 100 megabits/second (Mb/s) and the faster speed is 1000 Mb/s.

5. A network capable of communicating at different communication speeds, the network comprising:
an adaptive network repeater having a first network interface and a second network interface;
a first subnetwork coupled to the first network interface of the adaptive network repeater;
a second subnetwork coupled to the second network interface of the adaptive network repeater;
wherein the adaptive network repeater further comprises:
a first Ethernet physical interface controller (PHY), the first network interface coupled to the first PHY;
a second PHY, the second network interface coupled to the second PHY, the second PHY cross-coupled with the first PHY such that data received by the first PHY is transmitted by the second PHY and data received by the second PHY is transmitted by the first PHY;
a controller that monitors communication link status between the first and second PHYs and can control communication speed across the adaptive network repeater by control of communication speed of each of the first and second PHYs;
wherein data received from the first subnetwork at the first network interface is retransmitted to the second subnetwork through the second network interface, and data received from the second subnetwork at the second network interface is retransmitted to the first subnetwork through the first network interface;
wherein when the adaptive network repeater determines that the first and second subnetworks want to communicate across the adaptive network repeater at incompatible communication speeds, the adaptive network repeater determines a compatible communication speed, causes the first and second subnetworks to communicates at the compatible communication speed, communicates with the first subnetwork through the first network interface at the compatible communication speed, and communicates with the second subnetwork through the second network interface at the compatible communication speed;
wherein each of the first and second PHYs can auto-negotiate to communicate at a slower speed and a faster speed, the faster speed being faster than the slower speed, and
when the first PHY auto-negotiates with the first subnetwork to communicate at the slower speed and the second PHY auto-negotiates with the second subnetwork to communicate at the slower speed, the controller allows communication between the first and second PHYs at the slower speed;
when the first PHY auto-negotiates with the first subnetwork to communicate at the faster speed and the second PHY auto-negotiates with the second subnetwork to communicate at the faster speed, the controller allows communication between the first and second PHYs at the faster speed;
when the first PHY auto-negotiates with the first subnetwork to communicate at the faster speed and the second PHY auto-negotiates with the second subnetwork to communicate at the slower speed, the controller forces the first PHY to communicate at the slower speed which causes communication between the first and second PHYs at the slower speed and causes the first PHY to renegotiate with the first subnetwork to communicate at the slower speed; and
when the first PHY auto-negotiates with the first subnetwork to communicate at the slower speed and the second PHY auto-negotiates with the second subnetwork to communicate at the faster speed, the controller forces the second PHY to communicate at the slower speed which causes communication between the first and second PHYs at the slower speed and causes the second PHY to renegotiate with the second subnetwork to communicate at the slower speed.

6. The network of claim 5, wherein:
the first PHY has a first receive data output (RXD) port, a first transmit data input (TXD) port and a first input/output data management (MDIO) port,
the second PHY has a second RXD port, a second TXD port and a second MDIO port, and
wherein the first RXD port is connected to the second TXD port, the first TXD port is connected to the second RXD port, the first MDIO port is connected to the second MDIO port, and the controller monitors communication link status across the adaptive network repeater by monitoring the first and second MDIO ports.

7. The network of claim 5, wherein the slower speed is 100 megabits/second (Mb/s) and the faster speed is 1000 Mb/s.

8. The network of claim 5:
wherein the first subnetwork comprises a first switch and a first plurality of electronic devices, each of the first switch and the first plurality of electronic devices capable of communicating at at least one of the slower and faster speeds, the first switch electronically connected to the first network interface of the adaptive network repeater and the first plurality of electronic devices electronically connected to the adaptive network repeater through the first switch;
wherein when any of the first plurality of electronic devices of the first subnetwork communicates with the second subnetwork across the adaptive network repeater, the controller of the adaptive network repeater determines the communication speed.

9. The network of claim 8:
wherein the second subnetwork comprises a second switch and a second plurality of electronic devices, each of the second switch and the second plurality of electronic devices capable of communicating at at least one of the slower and faster speeds, the second switch electronically connected to the second network interface of the adaptive network repeater and the second plurality of electronic devices electronically connected to the adaptive network repeater through the second switch;
wherein when any of the plurality of electronic devices of the second subnetwork communicates with the first subnetwork across the adaptive network repeater, the controller of the adaptive network repeater determines the communication speed.

10. The network of claim 9 wherein network communication has a distance limit beyond which communication is unreliable, wherein the distance between the first and second switches is greater than the distance limit, and wherein the distance between the first switch and the adaptive network repeater and the distance between the second switch and the adaptive network repeater is less than the distance limit.

11. The network of claim 8:
wherein the second subnetwork comprises a second electronic device capable of communicating at at least one of the slower and faster speeds, the second electronic device electronically connected to the second network interface of the adaptive network repeater;
wherein when the second electronic device communicates with the first subnetwork across the adaptive network repeater, the controller of the adaptive network repeater determines the communication speed.

12. The network of claim 11, wherein network communication has a distance limit beyond which communication is unreliable, wherein the distance between the first switch and the second electronic device is greater than the distance limit, and wherein the distance between the first switch and the adaptive network repeater and the distance between the second electronic device and the adaptive network repeater is less than the distance limit.

13. A network communication method for communicating between a first subnetwork and a second subnetwork at different communication speeds, the network communication method comprising:
coupling the first and second subnetworks to an adaptive network repeater having a first network interface, a second network interface, a first Ethernet physical interface controller (PHY) coupled to the first network interface, a second PHY coupled to the second network interface and a controller;
electronically connecting the first subnetwork to the first network interface of the adaptive network repeater;
electronically connecting the second subnetwork to the second network interface of the adaptive network repeater;
cross-coupling the second PHY with the first PHY such that data received by the first PHY is transmitted by the second PHY and data received by the second PHY is transmitted by the first PHY;
monitoring communication link status between the first and second PHYs with the controller of the adaptive network repeater;
controlling communication speed across the adaptive network repeater by the controller of the adaptive network repeater controlling communication speed of each of the first and second PHYs:
retransmitting data received from the first subnetwork at the first network interface to the second subnetwork through the second network interface;
retransmitting data received from the second subnetwork at the second network interface to the first subnetwork through the first network interface; and when the adaptive network repeater determines that the first and second subnetworks want to communicate across the adaptive network repeater at incompatible communication speeds:
determining a compatible communication speed,
when the first subnetwork is trying to communicate across the adaptive network repeater at a speed different from the compatible communication speed, causing communication between the first network interface and the first subnetwork to be performed at the compatible communication speed; and
when the second subnetwork is trying to communicate across the adaptive network repeater at a speed different from the compatible communication speed, causing communication between the second network interface and the second subnetwork to be performed at the compatible communication speed;
wherein each of the first and second PHYs can auto-negotiate to communicate at a slower communication speed and a faster communication speed, the faster communication speed being faster than the slower communication speed, and
when the first PHY auto-negotiates with the first subnetwork to communicate at the slower communication speed and the second PHY auto-negotiates with the second subnetwork to communicate at the slower communication speed, the controller of the adaptive network repeater allowing communication between the first and second PHYs at the slower communication speed;
when the first PHY auto-negotiates with the first subnetwork to communicate at the faster communication speed and the second PHY auto-negotiates with the second subnetwork to communicate at the faster communication speed, the controller allows communication between the first and second PHYs at the faster communication speed;
when the first PHY auto-negotiates with the first subnetwork to communicate at the faster communication speed and the second PHY auto-negotiates with the second subnetwork to communicate at the slower communication speed, the controller of the adaptive network repeater forcing the first PHY to communicate at the slower communication speed, causing communication between the first and second PHYs at the slower communication speed and causing the first PHY to renegotiate with the first subnetwork to communicate at the slower communication speed; and
when the first PHY auto-negotiates with the first subnetwork to communicate at the slower communication speed and the second PHY auto-negotiates with the second subnetwork to communicate at the faster communication speed, the controller of the adaptive network repeater forcing the second PHY to communicate at the slower communication speed, causing communication between the first and second PHYs at the slower communication speed and causing the second PHY to renegotiate with the second subnetwork to communicate at the slower communication speed.

14. The network communication method of claim 13, wherein one of the first and second subnetworks can communicate at the slower communication speed and the faster communication speed, and the other of the first and second subnetworks can only communicate at the slower communication speed, the faster communication speed being faster than the slower communication speed; and wherein determining the compatible communication speed comprises selecting the slower communication speed.

15. The network communication method of claim 13, wherein network communication has a distance limit beyond which communication is unreliable, the network communication method further comprising:

when the distance between the first and second subnetworks is greater than the distance limit, electronically connecting the adaptive network repeater between the first and second subnetwork such that the distance between the first subnetwork and the adaptive network repeater is less than the distance limit and the distance between the second subnetwork and the adaptive network repeater is less than the distance limit.

* * * * *